US 6,690,798 B1

(12) United States Patent
Dent

(10) Patent No.: US 6,690,798 B1
(45) Date of Patent: *Feb. 10, 2004

(54) KEY TRANSFORMS TO DISCRIMINATE BETWEEN BEAMS IN A MULTI-BEAM SATELLITE COMMUNICATION SYSTEM

(75) Inventor: Paul W. Dent, Pittsboro, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,439

(22) Filed: Dec. 10, 1997

(51) Int. Cl.$^7$ .............. H04K 1/00; H04Q 7/20; H04M 1/66; H04M 1/68; H04M 3/16

(52) U.S. Cl. .............. 380/248; 455/410; 455/433

(58) Field of Search ................ 380/247, 248, 380/250; 455/410, 433

(56) References Cited

U.S. PATENT DOCUMENTS

| | | | |
|---|---|---|---|
| 4,549,308 A | 10/1985 | LoPinto | 455/26 |
| 5,060,266 A | 10/1991 | Dent | 380/49 |
| 5,091,942 A | 2/1992 | Dent | 380/46 |
| 5,153,919 A | 10/1992 | Reeds, III et al. | 380/44 |
| 5,159,634 A * | 10/1992 | Reeds, III | 380/28 |
| 5,172,414 A | 12/1992 | Reeds, III et al. | 380/45 |
| 5,235,614 A | 8/1993 | Bruckert et al. | 375/1 |
| 5,241,598 A * | 8/1993 | Raith | 380/21 |
| 5,283,829 A * | 2/1994 | Anderson | 380/24 |
| 5,309,501 A | 5/1994 | Kozik et al. | 379/58 |
| 5,377,267 A * | 12/1994 | Suzuki et al. | 380/23 |
| 5,392,357 A | 2/1995 | Bulfer et al. | 380/33 |
| 5,434,920 A | 7/1995 | Cox et al. | 380/49 |
| 5,455,861 A | 10/1995 | Faucher et al. | 380/9 |
| 5,455,863 A * | 10/1995 | Brown et al. | 380/23 |
| 5,481,611 A * | 1/1996 | Owens et al. | 380/25 |

(List continued on next page.)

FOREIGN PATENT DOCUMENTS

| | | |
|---|---|---|
| EP | 0 584 725 A1 | 3/1994 |
| EP | 0 673 178 A2 | 9/1995 |
| EP | 0 810 754 A1 | 12/1997 |
| WO | PCT/US 98/26000 | 3/1999 |

OTHER PUBLICATIONS

U.S. patent application Ser. No. 07/556,358, Dent, filed Jul. 20, 1990.
U.S. patent application Ser. No. 08/368,877, Dent, filed Jan. 05, 1995.
U.S. patent application Ser. No. 08/179,958, Dent, filed Jan. 11, 1994.

Primary Examiner—Gilberto Barrón
Assistant Examiner—Douglas J. Meislahn
(74) Attorney, Agent, or Firm—Myers Bigel Sibley & Sajovec

(57) ABSTRACT

A method and apparatus is described for transforming a key variable used for scrambling mobile data traffic between a terminal and a network in alternate ways based on a value transmitted to the terminal from the network. Transformation is accomplished by passing portions of the key variable through a series of S-boxes, which provide a mapping between inputs and outputs. The method and apparatus is explained also in the context of a satellite communications system, in which a terminal can be located in a different continent/country from the terminal's home location. Enciphered communication is enabled between the foreign satellite gateway and the roaming terminal after the foreign gateway communicates with the terminal's native gateway. The native gateway transmits one or more cipher variables in the communication. Moreover, the value determining which way to cipher the data traffic can be based on numerous factors, including aspects of the satellite communication system.

19 Claims, 5 Drawing Sheets

U.S. PATENT DOCUMENTS

| | | | |
|---|---|---|---|
| 5,528,693 A | 6/1996 | Leopold | 380/48 |
| 5,535,432 A | 7/1996 | Dent | 455/77 |
| 5,555,271 A | 9/1996 | Honda et al. | 372/45 |
| 5,592,555 A * | 1/1997 | Stewart | 380/49 |
| 5,594,776 A | 1/1997 | Dent | 379/58 |
| 5,594,795 A * | 1/1997 | Dent et al. | 380/23 |
| 5,594,798 A | 1/1997 | Cox et al. | 380/49 |
| 5,594,941 A | 1/1997 | Dent | 455/13.4 |
| 5,602,915 A * | 2/1997 | Campana et al. | 380/21 |
| 5,610,559 A | 3/1997 | Dent | 331/2 |
| 5,619,210 A | 4/1997 | Dent | 342/352 |
| 5,619,503 A | 4/1997 | Dent | 370/330 |
| 5,642,358 A | 6/1997 | Dent | 370/323 |
| 5,781,628 A | 7/1998 | Alperovich et al. | 380/9 |
| 5,781,654 A * | 7/1998 | Carney | 382/137 |
| 5,787,159 A * | 7/1998 | Hamilton et al. | 379/142.01 |
| 5,889,861 A * | 3/1999 | Ohashi et al. | 380/21 |
| 5,903,649 A * | 5/1999 | Schwenk | 380/241 |
| 5,987,139 A * | 11/1999 | Bodin | 380/44 |
| 5,991,642 A * | 11/1999 | Watanabe et al. | 455/560 |
| 6,016,425 A * | 1/2000 | Bannister | 455/422 |
| 6,035,039 A * | 3/2000 | Tisdale et al. | 380/23 |
| 6,038,446 A * | 3/2000 | Courtney et al. | 455/428 |

* cited by examiner

KEY TRANSFORMS TO DISCRIMINATE BETWEEN BEAMS IN A MULTI-BEAM SATELLITE COMMUNICATION SYSTEM

CROSS-REFERENCES TO RELATED APPLICATIONS

This application is related to application Ser. No. 08/270,565, filed Jul. 5, 1994, now U.S. Pat. 5,594,795, which is hereby incorporated by reference in its entirety herein.

BACKGROUND OF THE INVENTION

1. Technical Field of the Invention

The present invention relates to satellite communication systems and, in particular, to utilizing key transforms to discriminate between beams in a multiple-beam satellite communication system.

2. Description of Related Art and Objects of the Invention

Mobile wireless communication is becoming increasingly important for safety, convenience, and efficiency. One prominent mobile communication option is cellular communication. Cellular phones, for instance, can be found in cars, briefcases, purses, and even pockets. Cellular phones, like most mobile communication options, rely on the transmission of electromagnetic radiation from one point to another.

In general, a cellular mobile communications system is composed of many cells, each with a base station antenna for receiving transmissions. From the base station, the cellular system has interfaces for routing a call through or to the land-based, or terrestrial, telephone network, often referred to as the public switched telephone network (PSTN). The base stations form one half of the cellular system. Cell phones, called mobile stations, mobile terminals, or merely terminals, form the second half of the cellular system. In short then, electromagnetic radiation transmissions between terminals and base stations are an essential component of cellular systems, and such transmissions must be optimized by the cellular system to maximize cellular phone service, quality, and security.

Security becomes even more difficult to ensure when using satellites in a mobile communications system because the electromagnetic beams transmitted from the satellites can overlap countries and even continents. Therefore, a person on one continent can eavesdrop on another person's conversation on an entirely different continent. Nevertheless, satellite-based communication systems are desirable because they enable global coverage without necessitating closely-spaced cellular base stations.

Throughout the following, the terms cellular mobile telephone, cellular phone, cellular telephone, mobile telephone, phone, radiotelephone terminal, cellular terminal, mobile terminal, and "terminal" may be used equivalently to refer to a wireless communications device capable of wirelessly transmitting and receiving data. Also, the terms radiotelephone network, cellular system, and cellular network are used equivalently to refer to a wireless communications system which provides wireless data connections between two or more terminals or between two or more terminals and other equipment.

Cellular mobile telephones and other such radio communications devices are usually designed to meet the requirements of a limited number of standards in common use in the world. Many countries choose the same standard; for example the pan-European Global System for Mobile Communications (GSM) is used by 14 European countries, Australia, and some Middle Eastern countries. The U.S. digital cellular standard, IS-54B Cellular System Dual-Mode Mobile Station-Base Station Compatibility Standard (available from the Telecommunications Industry Association, 2001 Pennsylvania Avenue, N.W., Washington D.C., 20006) (IS-54B) is used, for example, in the USA, Mexico, Canada, and South America. As a result of their being only a handful of mobile communication system standards, as well as economies of scale, mobile telephones are produced in enormous volume and generally adapted so that the design is the same for many markets.

The current invention belongs to the field of anti-fraud and privacy systems for public or private wireless communications systems, such as digital cellular telephone systems. Such systems may use authentication procedures for verifying the identity of a mobile phone attempting to access the network or to verify the network to the phone, as well as scrambling to prevent traffic broadcast to one mobile accidentally or deliberately being received by another.

A problem that has arisen before is that mobile telephone numbers are re-used in other countries and therefore not guaranteed to be unique in the whole world. Thus, an IS-54B telephone from a Far Eastern country brought to the United States by a traveler may have the same telephone number (mobile identification number, or MIN) as a "native" American phone, and can sometimes access the network in an unforeseen manner, including fraudulently. It is an object of anti-fraud systems to prevent such unauthorized access.

Anti-fraud systems make use of a secret number like a PIN code embedded into every phone. The number stored in the phone is also stored in the telephone exchange belonging to the operator with which the user has a subscription. A phone attempting to access a network is "challenged" with a random number which it is invited to combine with the secret PIN code in a defined way and to return a result. The network meanwhile contacts the phone's home exchange with the random number and invites it to do likewise. If the result from the phone matches that from the home exchange, the phone is admitted to the network, and the network is fairly certain that its bill for services can be sent to the phone's home operator and that it will be honored.

While it may not be too difficult to ensure that unique PIN codes are issued to all phones registered with a particular operator, it is not so obvious how to coordinate PIN code issuance between operators to guarantee uniqueness, without compromising security by allowing too many organizations to have access to secret information. It is not very likely that all the coordination required could be achieved between continents. Therefore, the invention provides a means of discriminating the security information between different networks such that uniqueness of the information is not a necessity.

U.S. Pat. No. 5,091,942, granted to applicant, which is hereby incorporated by reference in its entirety herein, discloses a bilateral authentication procedure that verifies a mobile phone to the network as well as the network to the phone. The inventive bilateral authentication system also produces as a byproduct a temporary variable to be used for scrambling traffic. U.S. Pat. Number 5,060,266, also granted to applicant, which is also hereby incorporated by reference in its entirety herein, describes a type of scrambling system suitable for such purposes. Furthermore, a suitable algorithm is described in U.S. patent application Ser. No. 07/556,358 (Dent, filed Jul. 20, 1990), which is also hereby incorporated by reference in its entirety herein.

The referenced prior art discloses use of a 64-bit temporary key, which is produced during the authentication procedure, to generate with the aid of a speech frame or time division multiple access (TDMA) transmission frame counter, a block of keystream bits for every frame which may be exclusive-ORed to traffic data to prevent it being received by a radio not in possession of the same 64 bits. The known prior art does not provide a means to ensure that radios of the same design, delivered to perhaps different continents and accidentally in possession of the same 64-bit key, cannot receive or transmit the same signal.

It is an objective of the invention to provide a means whereby portable communications devices such as cellular phones can be delivered all over the world with the same design without compromising the security of anti-fraud and privacy features in any one country or continent. This is particularly desirable in connection with global satellite communications systems which may be constructed using multiple-beam satellite systems as described, for example, jointly by U.S. Pat. Nos. 5,594,941, 5,555,271, 5,619,503, 5,619,210, 5,594,776, 5,535,432, and 5,610,559, and by U.S. patent applications Ser. Nos. 08/225,399 (filed Apr. 8, 1994) and 08/368,877 (filed Jan. 5, 1995) which is a continuation-in-part of 08/179,958 (filed Jan. 11, 1994). All disclosures of which are hereby incorporated by reference in their entirety herein.

A particular case of the problems referred to above arises in a global satellite communications system that attempts to use a limited number of satellites to provide service to subscribers all over the globe. The satellite telephones in question can, in principle, be of hand or portable size and be of the same design for use all over the globe. The problem of ensuring key uniqueness with a global number of subscribers is more difficult than with a national number of subscribers. Complications arise also due to the satellite system being a single network with a subscription that is not linked to any particular nation. It may thus arise that telephones could be purchased in one country for use in another, yet it is desirable to ensure that anti-fraud steps used in one part of the world do not cause weaknesses in other parts of the world, as stated above.

In addressing the security issues in global satellite communication systems, it must be considered that a desired feature of such a system is that a subscriber shall be able to make and receive calls to his same telephone number wherever he temporarily happens to be. This requires subscribers to have a globally unique telephone number embedded into their satellite/cellular telephones. The method by which a particular telephone is reached is described in the aforementioned U.S. Patents and Patent Applications, which have been incorporated by reference herein in their entirety.

In distinction to cellular networks that more-or-less coincidentally decide to adopt one or another of the cellular standards used in other parts of the world, without the specific intention of serving visiting subscribers from those other places, a satellite mobile system specifically aims to serve subscribers that have roamed from one part of the globe temporarily to another. Prior art security and anti-fraud measures, however, have heretofore failed to address the needs of a satellite mobile system where subscribers are expected to transport their mobile telephones across national borders and even onto different continents.

The above deficiencies in the prior art are overcome by use of the invention of the parent application as adapted and extended by the further descriptions herein. The current invention has the following objects (and others not specifically listed):

An object of the invention is to provide a technique for discriminating the security information between different networks such that uniqueness of the information is not a necessity.

Another object of the invention is to provide a technique whereby portable communications devices such as cellular phones can be delivered all over the world with the same design without compromising the security of anti-fraud and privacy features in any one country or continent.

Yet another object of the invention is to provide a technique to authenticate a subscriber registered in one part of the world to receive service in another part of the world, which parts of the world are not even both simultaneously visible from the same satellite.

A still further object of the invention is to prevent unauthorized reception of traffic transmitted from a satellite to a subscriber in one part of the world by a receiver in another part of the world in which the same satellite is visible.

SUMMARY OF THE INVENTION

The present invention provides a method and apparatus in a mobile communication system. The mobile network provides service to mobile terminals via at least one orbiting satellite in communication with a network of ground stations. This mobile, satellite-based communication system can cross national borders as well as overlap continents.

The technique of the present invention enables ciphering and deciphering of signals transmitted between a foreign satellite gateway and the mobile terminal. A key variable is transformed and used for scrambling mobile data traffic between the mobile terminal and the foreign satellite gateway. The scrambling varies depending on the selected cipher mode, as can be transmitted by the foreign satellite gateway. Transformation is accomplished by passing portions of the key variable, or related or derivative variables, through an authentication algorithm and a series of S-boxes, which provide a mapping between inputs and outputs. This produces a session key (S-key) that dictates the scrambling code.

In one embodiment, a foreign satellite gateway initially determines the identity of a roaming terminal. The roaming terminal's identity can then be used to determine a home satellite gateway from which a key variable and possibly other cipher values can be obtained. The foreign satellite gateway next requests one or more cipher variables from the home satellite gateway.

Enciphered communication can then be enabled between the foreign satellite gateway and the roaming terminal after the foreign gateway communicates with the terminal's native gateway. The native gateway transmits one or more cipher variables in the communication. The variables are used by the foreign gateway in conjunction with the mobile terminal to (i) enable ciphering, (ii) prove to the mobile that the gateway is legitimate, and (iii) prove to the gateway that the mobile is legitimate and is likely to pay for the resulting charges, termed authentication.

As stated above, the cipher mode can vary. Moreover, the value determining how to cipher the data traffic can be based on numerous factors, including aspects of the satellite communication system. For example, it can be based on (a) the home location register (HLR) on which the mobile has a permanent subscription, (b) the visiting location register (VLR) in which the roaming mobile is presently registered, (c) the territory in which the other call party is located, (d) the territory in which the ground station delegated to handle the call is located, and/or (e) subscriber profile information retrieved from the HLR.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, circuit components, techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

A preferred embodiment of the present invention and its advantages are best understood by referring to FIGS. 1–5 of the drawings, like numerals being used for like and corresponding parts of the various drawings.

Figure 1:
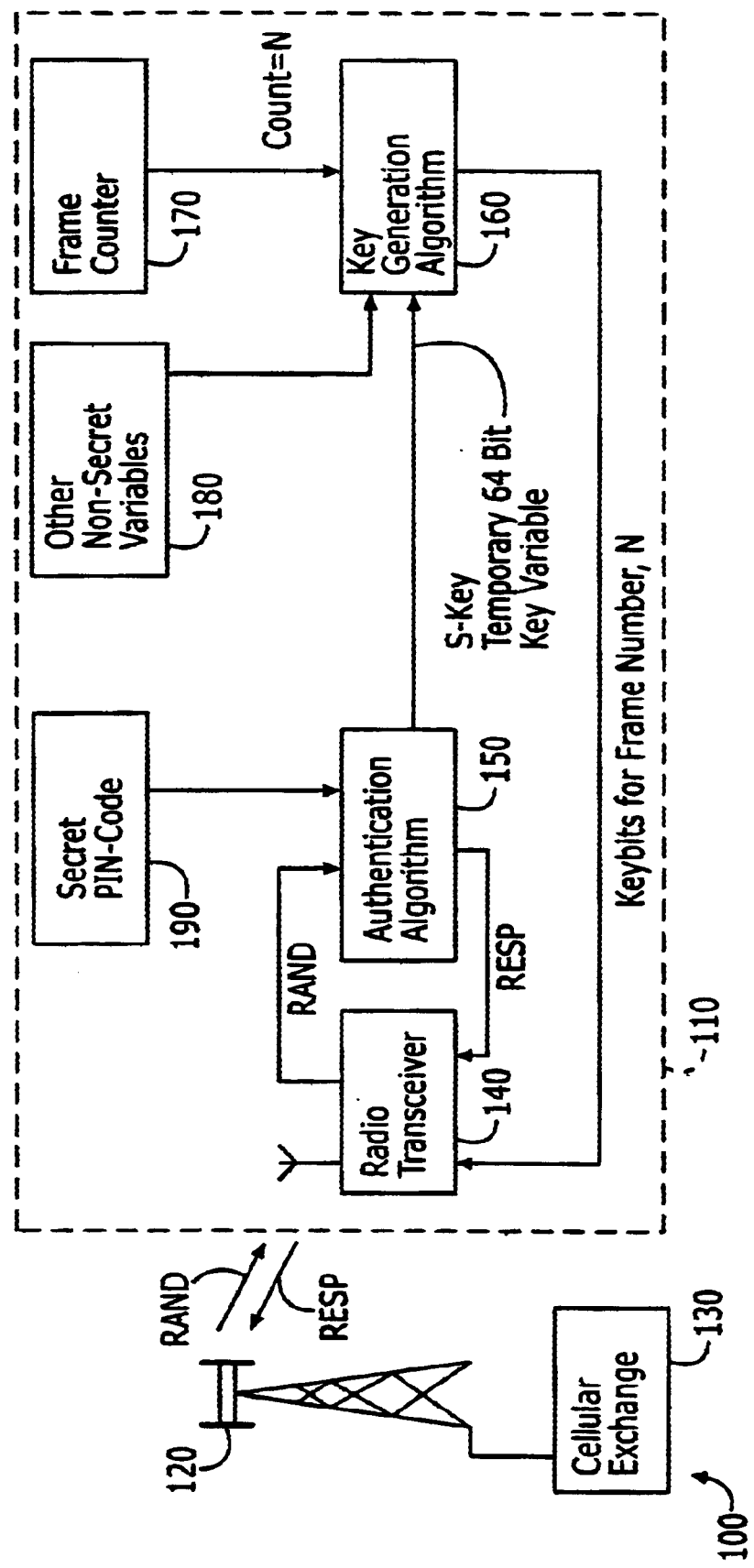
FIG. 1 illustrates a relationship between authentication and keystream generation systems according to the prior art.

A brief description of the existing prior art will be helpful in understanding the operation of the present invention. FIG. 1 schematically illustrates a cellular network 100 in radio communication with a cellular phone 110. Cellular network 100 includes a cellular base station 120 and a cellular exchange 130, such as a mobile switching center (MSC). A typical cellular exchange 130 may be coupled to a plurality of base stations 120. Further, a typical cellular network 100 may include hundreds of base stations 120 and a plurality of interconnected cellular exchanges 130.

Cellular phone 110 includes, in addition to other elements not shown, radio transceiver 140, authentication algorithm 150, key generation algorithm 160, frame counter 170, secret PIN code 190, and other non-secret variables 180. Items 150, 160, and 170, for example, may be integrated into a single microprocessor, but they are shown as separate functional blocks to illustrate clearly the connections between these functions. Items 180 and 190 are stored in an appropriate memory device, such as a read only memory (ROM) Radio transceiver 140 may be designed to provide radio communications in accordance with the aforementioned IS-54B standard according to known methods.

During the authentication procedure described generally hereinabove and in detail hereinbelow, cellular telephone 110 receives, from time to time, a radio signal including an authentication challenge. The authentication challenge includes a random number (RAND) generated by cellular network 100 and broadcast via cellular station 120. The radio signal containing RAND is received, demodulated, and decoded according to known methods by radio transceiver 140, which is coupled to the authentication algorithm 150. Authentication algorithm 150 combines RAND with secret PIN code 190 to generate a response RESP which the transceiver 140 transmits to base station 120, where it is subsequently received by cellular network 100. An example of an authentication algorithm 150 is described in detail in U.S. Pat. No. 5,091,942, which is hereby incorporated by reference in its entirety herein.

A byproduct of the authentication algorithm 150 is a 64-bit temporary key variable, known as the session key (S-key), which is coupled to key generation algorithm 160 to be used for scrambling data traffic for a period of time until the next time the S-key is changed by a new authentication challenge. This can occur, for example, once per conversation if desired for security reasons. The key generator uses the value of S-key, which is fixed for a period of time, together with the frame counter 170, which systematically varies during said period of time, to produce a non-repetitive sequence of pseudo-random keystream bits for overlaying data traffic according to known methods. An example of a key generation algorithm 160 is described in detail in U.S. Pat. No. 5,060,266, which is hereby incorporated by reference in its entirety herein.

In this prior art system, it is not impossible to ensure that all cellular phones 110 operating in, for example, the North American continent have unique PIN codes 190 because there is automatic, interswitch signaling between cellular networks 100 in order to provide roaming. It is, however, difficult to ensure that unique PIN codes 190 can be assigned to cellular telephones 110 intended for use on other continents which have cellular systems that are not interconnected via interswitch signaling to, for example, the North American cellular network. It is very possible, for example, that one of the millions of cellular phones 110 delivered to other continents utilizing cellular phones 110 according to the same cellular standard (e.g., IS-54B) will have the same PIN code 190 as used by one of the millions of cellular phones 110 operating in North America. Thus, when challenged with the same RAND, both will produce the same 64-bit S-key. A "foreign" cellular phone 110 having the same PIN code 190 as an authorized "native" cellular phone 110 also operating in North America will therefore produce the same keystream sequence for scrambling purposes and will be able to "listen-in" on a supposedly secure link. It is also possible that PIN codes may be duplicated deliberately for illicit or illegal purposes.

The probability of having the same S-key in two cellular phones 110 using the prior art system of FIG. 1 is equal to two raised to the negative sixty-fourth power. Although statistically infrequent, the technique represented by FIG. 1 can never guarantee that duplication will not happen. Furthermore, it is more undesirable that a pair of cellular phones 110 having the same PIN code 190 produce the same S-key when challenged with the same RAND. It is, however, less worrisome if two cellular phones having the same PIN code 190 produce the same S-key in response to different authentication challenges. In other words, it is less worrisome if two mobiles produce the same keystream when it is not always the same two, but rather random pairs for different conversations that can not be anticipated.

Figure 2:
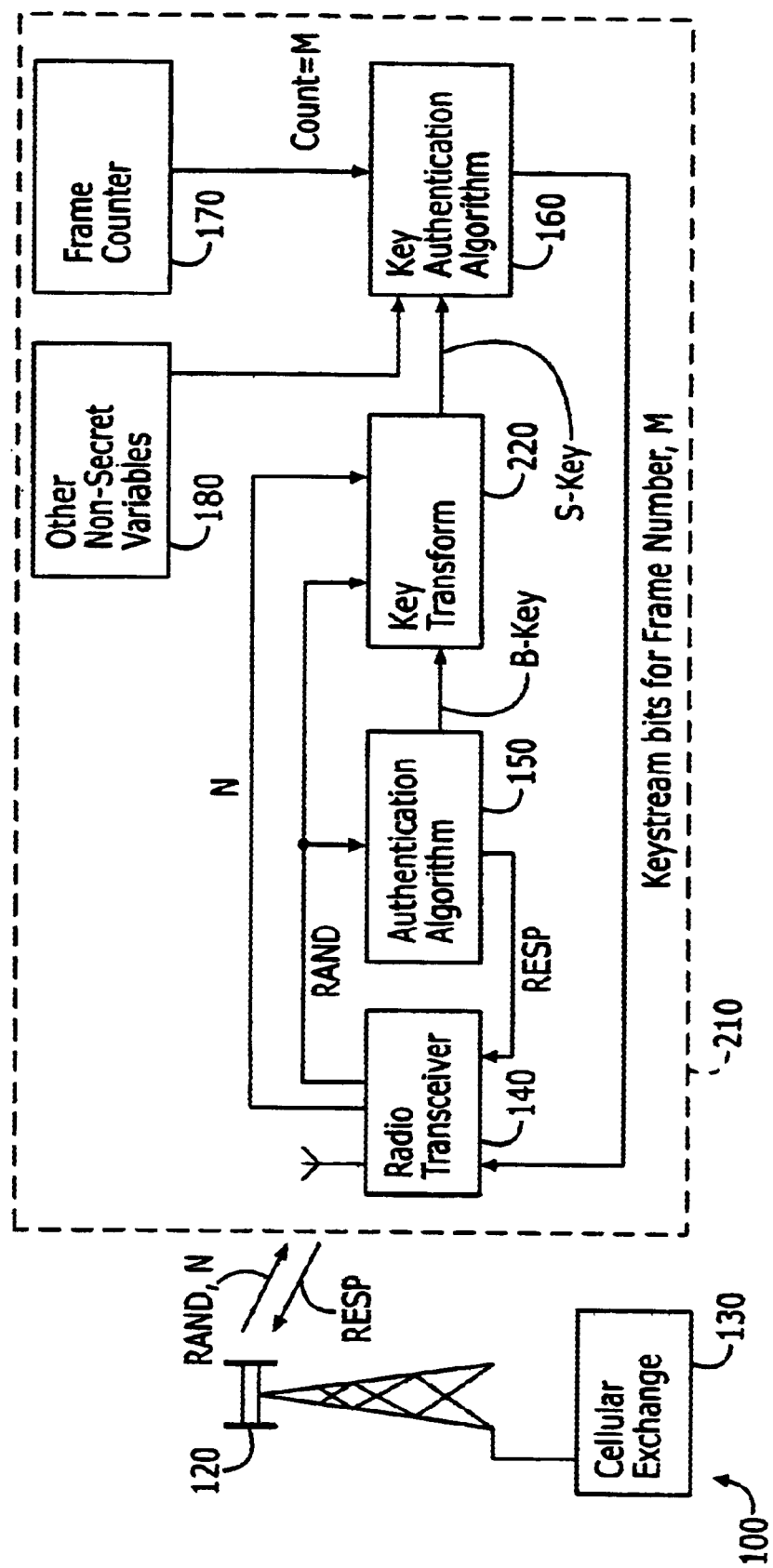
FIG. 2 illustrates a relationship between authentication and keystream generation systems according to a preferred embodiment of the invention.

The invention is structured broadly as shown in FIG. 2 for land cellular applications. A cellular network 100 transmits a random authentication challenge RAND together with a value N. The value N indicates how the B-key (as it is now denoted), which is byproduct of the authentication process 150, shall be further scrambled in key transform process 220 in order to determine the s-key for use by the key generation algorithm 160. The indication N determines one of several ways in which key transform 220 can combine the B-key and RAND to produce the S-key. At a minimum, a preferred embodiment can comprise only two alternate indications N, A or B. If the A indication is received, it means a first value of an integer n shall be used by the key transform 220. On the other hand, if the B indication is received, a second integer value of n shall be used. The A indication might be issued by networks that are not integrated into the North American network, for example, while the B indication is issued by base stations within the North American network.

Further details illuminating how the key transform 220 can use the value of an integer n to modify the creation of the S-key from the B-key will now be given with reference to FIG. 3.

Figure 3:
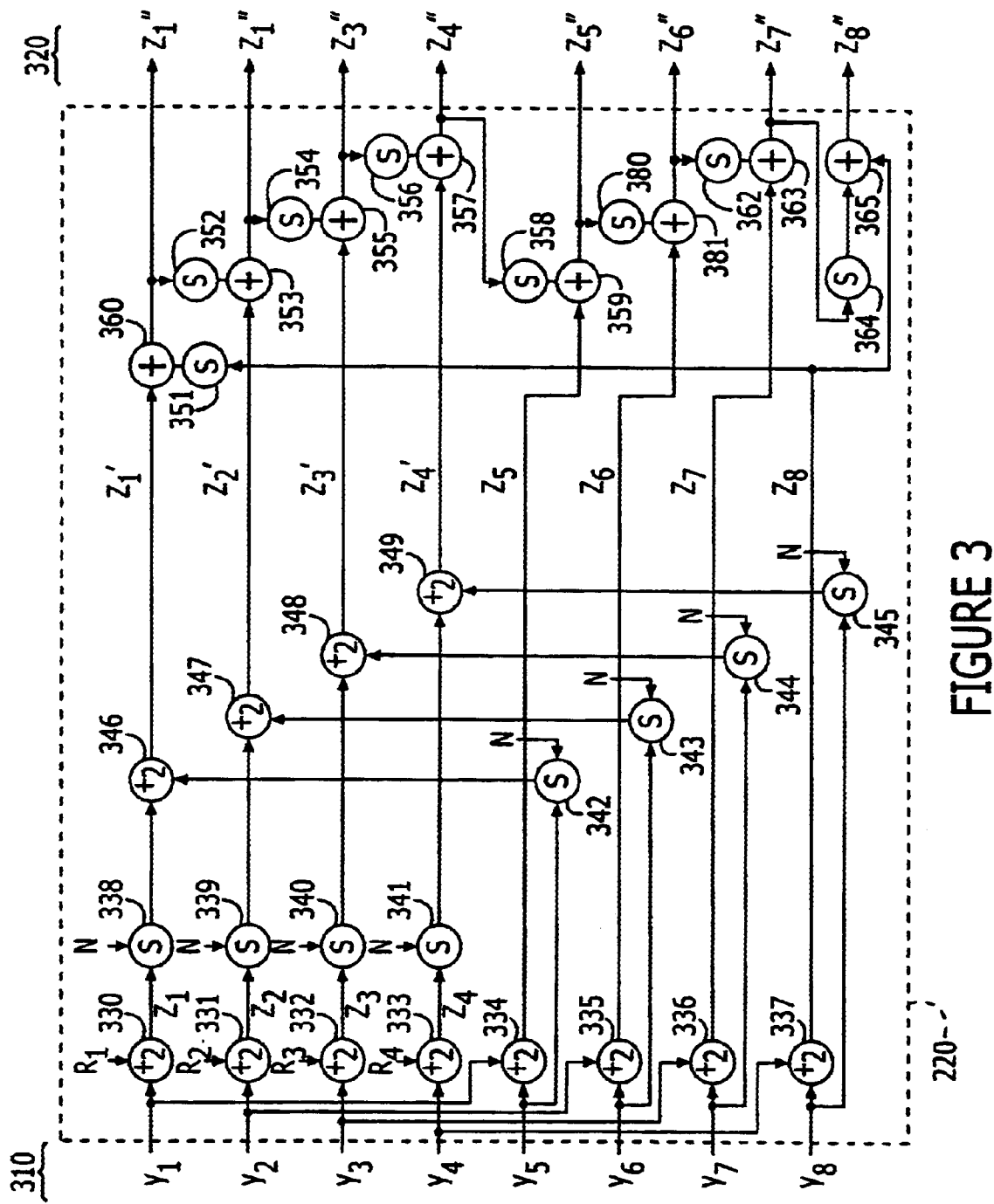
FIG. 3 illustrates a transformation process according to a preferred embodiment of the invention.

In FIG. 3, the 64-bit B-key 310 is denoted by the eight bytes: y1, y2, y3 . . . y8. Likewise, the 32-bit RAND is denoted by four byte-length quantities: R1, R2, R3, and R4.

Byte-wide modulo-2 adders 330–337 combine the y-bytes and the R-bytes (y1 with R1, y2 with R2, y3 with R3, y4 with R4, y5 with y1, y6 with y2, y7 with y3, and y8 with y4) to produce eight new byte-length quantities: Z1, Z2, Z3, . . . Z8. The first four new quantities, Z1, Z2, Z3, and Z4, are passed through S-boxes 338–341 iteratively N times. An "S-box" refers to a process of substituting an output value for an input value. An S-box may constitute a 1:1 mapping, in which case there is provided a unique output value corresponding to every possible input value, or it may constitute a MANY:1 mapping, in which case several input values map to the same output value. The former is also known as an information-lossless process, whereas the latter is an information-lossy process. In an information-lossy process, the number of possible variations in the output value is smaller compared with the number of possible variations in the input value. In this application, an input value may be passed through the S-box a number of times en route to becoming an output value, and it is undesirable that the number of possible variations in output values be reduced; therefore, an information-lossless process (1:1 S-box) is preferred.

The last four original B-key bytes 310, y5 . . . y8, are also passed through the S-boxes 342–345 iteratively N times. An S-box, in practice, causes an input byte, for example Z1, to be applied as an 8-bit address to a 256-byte look-up table S. The look-up table then produces an output byte stored at the addressed location within S.

This constitutes a single iteration (i.e., N=1). The output byte is then applied again as an address at the input of S to obtain a new output byte. This constitutes a second iteration (i.e., N=2). The process is repeated the number of iterations indicated by the value of N. The iterated outputs are then combined in pairs by byte-wide exclusive-OR gates 346–349 to yield Z'1, Z'2, Z'3 and Z'4.

Z8 is then passed through the look-up table S 351 and arithmetically added to Z'1 (at adder 350) to get the first of the eight bytes of S-key 320, Z"1.

Then Z"1 is passed through S-box 352 and added to Z'2 (at adder 353) to obtain the second S-key 320 byte Z"2. This process of passing the last Z' byte calculated through an S-box (354, 356, 358, 360, 362, and 364) and adding the output to a Z' or Z byte (at adders 355, 357, 359, 361, 363, and 365) continues until all four Z' bytes have been used, and then it continues in the same fashion using the remaining Z bytes, Z5 . . . Z8, have been used. This process eventually yields a total of eight bytes of S-key 320, Z"1 . . . Z"8.

The final scrambling process is reversible and does not therefore constitute a so-called "one-way" function. It is not the purpose of the final scrambling process to ensure that Z' may not be derived from Z", but rather it is to ensure that any 1-bit change in an input causes, on average, half the output bits to change. A reversible function has the advantage that it is clearly information-lossless, and it does not result in the number of possible output values of Z" (two to the sixty-fourth power) being less than the number of possible input values of Z'(also two to the sixty-fourth power). The one-way function property is obtained, however, in the key generation algorithm 160, which ensures that the bits of S-key 320 (Z") cannot be derived from observation of its output keystream bits.

The above algorithm assumes availability of four bytes of a random quantity RAND (R1, R2, R3, and R4), but it is not restricted to this number. If fewer than four bytes of RAND are available, other data may be substituted, such as a logical link number and a traffic direct on indicator, to increase the number of bytes to four. This substitution can provide independent scrambling keys for each of a number of logical or virtual channels supported by the same radio link, as well as providing independent scrambling keys for each direction of traffic flow (mobile-to-base or base-to-mobile).

The above algorithm discloses a means of transforming a key variable used for scrambling mobile telephone transmissions in alternate ways, depending on the network the mobile station is operating in, by transmitting from the network an indication (N, in the example above) of how internal variables shall be scrambled by passage through one or more S-boxes. Moreover, it is disclosed above how to save memory demanded by substitution boxes by using, instead of an alternate S-box for a first and a second network indication, the same S-box used iteratively an alternate number of times depending on the network indication in at least part of the key transformation process. Of course, it is always possible to reduce computation at the expense of memory requirements by recording alternate S-boxes, one for use with the first network indication and one for use with the second network indication, as well as the common S-box S, which is used in another part of the algorithm with either network indication. The invention, however, is more concerned with (i.e., a preferred embodiment involves) saving memory than on saving processing power because the process of key transformation is preferably performed only once per call, at most. Nevertheless, the options discussed above are all considered to be within the scope and spirit of the invention as they relate to the claims below.

In a land cellular system, there is no loss of security in transmitting the authentication challenge RAND and the A/B indication N over the air because these values must be combined with secret subscriber key information only stored (i) in the cellular network and (ii) in the subscriber terminal and never transmitted over the air. The secret subscriber key information is stored in a Home Location Register (HLR), which is the term given to an exchange or database belonging to the telephone subscriber's service provider. When the subscriber is not in the HLR service area and is instead requesting service at a Visiting Location Register (VLR), the VLR must involve the HLR in setting up a temporary key (B-key or S-key) for the session. It is very undesirable for the HLR ever to release the subscriber's permanent secret key to another party, or even to permit transmission of it at all, even when the request is received electronically. Consequently, the HLR restricts itself to issuing temporary keys computed from the permanent secret key and RAND by means of a one-way function.

In a cellular network, the temporary keys (B-key or S-key) are transmitted from the HLR to the VLR over a special inter-network land line which is not prone to interception, as radio signals are. In a global satellite system, however, the satellite operator may logically wish to employ the satellite network itself to exchange security information between the VLR and the HLR. Although the VLR and the HLR are tot necessarily both within view of the same satellite at the same time, it is expected that all ground stations in the satellite system will maintain connectivity with each other either through commonly visible satellites or via land lines at a minimum.

When such security information is exchanged via a common satellite, the signals are subject to unauthorized reception and therefore must be protected by a high-grade cipher. Ideally the security variable traffic should be decipherable only at the destination VLR or gateway (to the satellite mobile system) and not at an intermediate gateway. For a modest number of gateways, the best method of ensuring security en route is to employ a unique cipher key for communicating between any pair of gateways, a total of [X(X−1)]/2 keys are then needed when the number of gateways is X. Only X−1 of the keys, termed herein an X-list, are stored and available at each of the X gateways. Since it is not unreasonable to store 1000 keys, this system may be employed between as many as 1000 gateways or 1000 VLRs.

In a mobile system, a call setup is initiated either by a request from a mobile terminal for service or by a call from the network to a mobile terminal. The first step is for the terminal to identify itself to the network by means of its International Mobile Station Identity Number (IMSI). Alternatively, when a mobile identifies itself to the network within the same part of the network or paging area it has previously registered itself in, a Temporary Mobile Station Identity (TMSI) may be employed that is unique only within the relevant, previously-registered-in limited area. This provides a way for a mobile terminal to identify itself to the network without disclosing its identity to everyone.

The next step is for the network to authenticate the mobile terminal's claimed identity by issuing a random challenge RAND, receiving a response from the mobile that is a function of RAND and the mobile's permanent secret key, and comparing the response with a corresponding response computed from the same input data at the mobile terminal's HLR. It is optional whether RAND is decided extemporaneously by the VLR and communicated to the terminal in order to receive a response before the VLR then communicates both RAND and the response to the HLR, or whether the VLR makes contact with the HLR first and receives the RAND from it. The preferred sequence is the bilateral authentication procedure described in U.S. Pat. No. 5,091,942, which is hereby incorporated by reference in its entirety herein.

Using bilateral authentication, the VLR contacts the HLR before issuing a challenge to the mobile. The VLR identifies itself to the HLR and thereafter encrypts all traffic to that HLR with a network key unique to that HLR-VLR pair, as determined, for example, from an X-list. The HLR likewise encrypts all traffic back to the VLR with that same network key. The VLR conveys the claimed mobile identity (e.g. IMSI) to the HLR, and the VLR and HLR then agree on an authentication challenge, RAND. From RAND and the mobile's permanent secret key, which is only available at the HLR, the HLR computes two responses, RESP1 and RESP2, which it transmits to the VLR. The VLR transmits RAND and RESP2 to the mobile terminal.

The mobile terminal computes RESP1 and RESP2 locally from RAND and its permanent secret key, and if the mobile's computed RESP2 matches the RESP2 received from the VLR, then the mobile has a reliable indication that the authentication challenge has been received from a genuine network that is in contact with the mobile's HLR. The mobile then sends RESP1 to the VLR. At the VLR, if the RESP1 returned from the mobile matches the RESP1 received from the HLR, then the VLR has a reliable indication that the responding mobile is genuine. Alternatively, an even higher level of security is provided if the HLR in the first instance only transmits RESP2 to the VLR. The VLR returns the RESP1 received from the mobile to the HLR. At the HLR, if the RESP1 received from the mobile matches the RESP1 calculated locally, the HLR has a reliable indication that the VLR is indeed in contact with a genuine mobile terminal. Only then would the HLR release a B-key or S-key, a byproduct of the authentication computations, to the VLR for use as a temporary session key. Upon receipt of the session key, the VLR may switch to enciphering subsequent communications with the terminal, at a time mutually agreed upon with the terminal through exchange of a signal.

Figure 4:
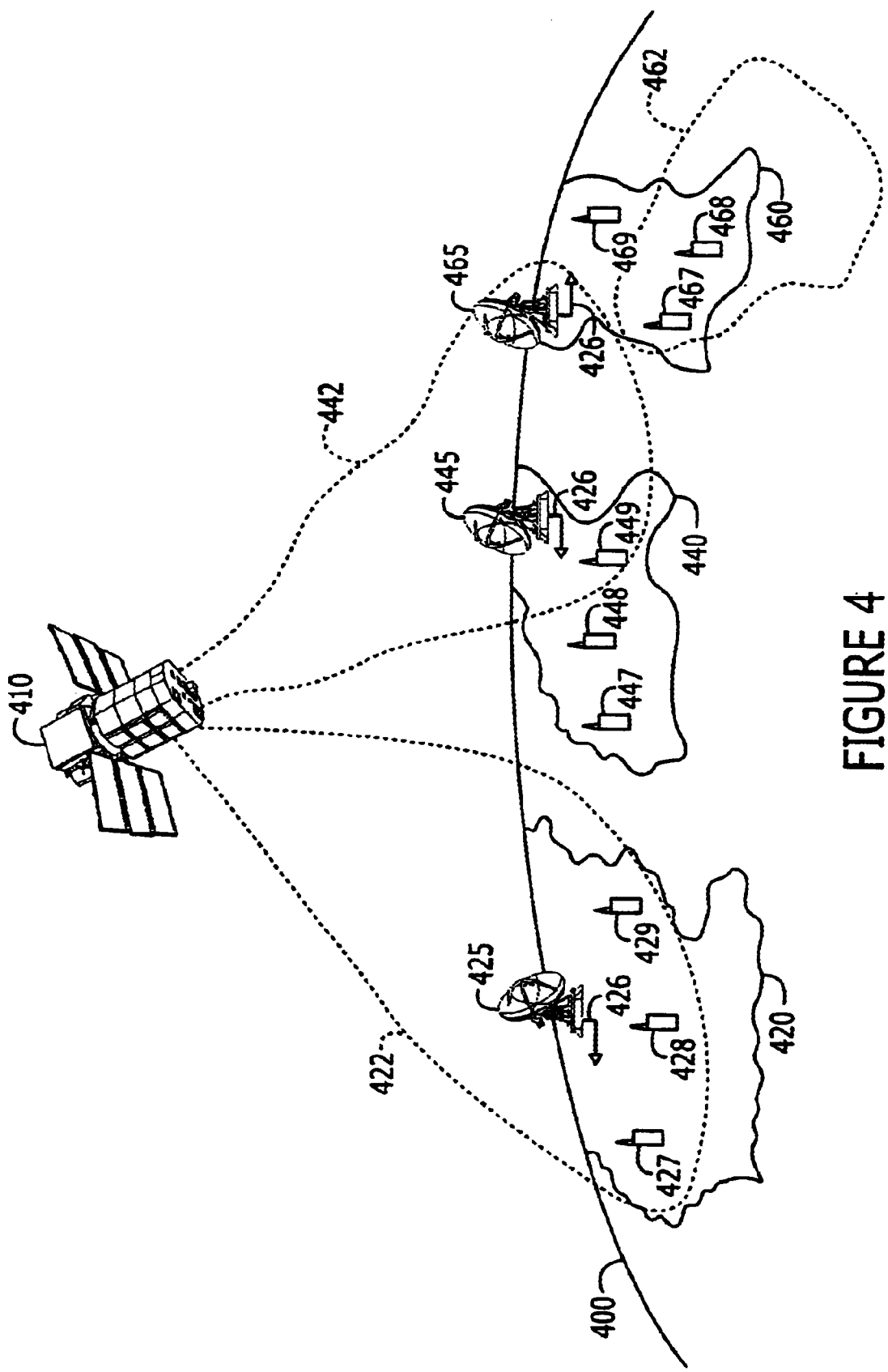
FIG. 4 illustrates a global, multi-beam satellite system according to a preferred embodiment of the invention.

Referring now to FIG. 4, a satellite mobile communications system is illustrated over part of earth 400. For simplicity, only a single satellite 410 is shown that provides at least partial coverage to several continents, countries or independent political blocks, illustrated as continents 420, 440, and 460. In other words, though continents are specifically depicted in FIG. 4, elements 420, 440, and 460 can also be countries, independent political blocks, etc. Satellite 410 is shown directing beams 422 and 442 (denoted by dotted lines) toward the earth at continent(s) 420 and 440/460, respectively; beam 462 is also shown covering part of continent 460.

Each continent 420, 440, and 460 may possess a ground station (denoted by 425, 445, and 465, respectively), which provides the connection between the satellite and the local Public Switched Telephone Network (PSTN). Connections to the PSTN are denoted by 426, 446, and 466, respectively. Ground stations 425, 445, and 465 will normally include a satellite-mobile switching center for handling mobility management issues of roaming, registration or location update, and security operations for their own (native) mobile subscribers as well as other providers' (non-native) subscribers that have roamed into the territory that they serve.

Such native and non-native subscribers are illustrated as mobile phones 427, 428, and 429, which are presently located in continent 420, but which are respectively native subscribers of continents 420, 440, and 460, respectively. Likewise, mobiles 447, 448, and 449 are located in continent 440, but are native subscribers of continents 420, 440, and 460, respectively; mobiles 467, 468, and 469 are located in continent 460, but are native subscribers of continents 420, 440, and 460, respectively.

Importantly, mobile 427 is native to continent 420, and mobile 428 is native to continent 440, but is presently roaming in continent 420.

When a network spans only two countries or continents, for example, four cases may be identified for more-detailed consideration:

i) A mobile native of continent 420 makes or receives a call while located on continent 420.

ii) A mobile native of continent 440 makes or receives a call while located on continent 440.

iii) A mobile native of continent 420 makes or receives a call while located on continent 440.

iv) A mobile native of continent 440 makes or receives a call while located on continent 420.

A further complication for satellite communication systems is that the ground station that links the satellite network to the PSTN may be located on continents 420, 440, or 460, as pictured at 425, 445, and 465 in FIG. 4.

A number of different scenarios for routing calls may be postulated. These scenarios may depend on whether the calling subscriber is the mobile subscriber or the fixed subscriber and on whether the called subscriber is in the same or a different continent. Normally, such intercontinental traffic represents a tiny fraction of calls in a land-based cellular service, and therefore the prior art has not had to confront the problems this invention addresses. However, intercontinental roamers are one of the main types of customers that a global satellite system is intended to serve, and the intercontinental phone traffic may represent the total satellite traffic and possibly the majority of the traffic in beams covering major financial capitals such as London, New York, and Tokyo.

The simplest situation is when a satellite-mobile, located in home territory, calls or is called by a PSTN subscriber located in the same territory; this corresponds to either (i) or (ii) above. By way of example only, consider that mobile phone 427 in FIG. 4 is called by a fixed (PSTN) subscriber located on continent 420. In this case, it is logical for ground station 425, which is on the same continent 420, to make the connection between signals sent via the satellite to/from mobile 427 and the signals to/from the PSTN subscriber (via PSTN connection 426).

Because satellite beams are much larger than cellular cells and may be easily receivable over even wider areas via antenna side lobes, it is even more desirable than in the cellular case to encipher traffic to prevent unauthorized eavesdropping, which now may be accomplished even from different continents instead of requiring that the eavesdropper be more-or-less within the same cell as the mobile subscriber. Since the mobile phone 427, ground station 425, and fixed subscriber (not pictured, but connected over wire to PSTN connection 426) are all native to continent 420 however, there is no problem on agreeing how security issues such as establishing an enciphering key should be handled.

Assuming the calling subscriber is the PSTN subscriber, his or her local phone exchange would route the call via trunk exchanges eventually to PSTN connection 426 and thence to ground station 425. Next, the Mobile Switching Center (MSC) associated with ground station 425 will determine which beam the called subscriber 427 is currently located in. Determining that the beam is beam 422, a calling channel message is broadcast to mobile phone 427 using satellite beam 422 and picked up by mobile phone 427; it then replies to the call and there follows, if so determined by the MSC, an authentication challenge-response exchange in which the mobile is authenticated as genuine and a B-key is established for the call, as explained hereinabove. According to a preferred embodiment of the invention, the MSC sends an indication to the ciphering equipment, which is typically part of the voice channel signal processing equipment located at ground station 425, that it shall employ the B-key in a manner established for continent 420. For example, it can be employed by transforming it to an S-key or ciphering key in dependence on the indication from the MSC or, in general, by processing the B-key according to the MSC's indication in order to effect ciphering of the signals transmitted via the satellite in any desired manner.

An alternate type of call corresponds to (iii) or (iv) above. By way of example only, consider that mobile phone 428, native of continent 440 but currently located in continent 420, makes or receives a call with a PSTN subscriber located in his native continent 440. In principle, this call could be handled by ground station 425, but that would involve making an international connection to the PSTN of continent 440 by some other means, thus incurring transport charges. To avoid unnecessary transport charges, the call is preferably handled by the nearest ground station or gateway to the PSTN subscriber, in this instance ground station 445. Because the mobile subscriber 428, PSTN subscriber (not pictured, but connected by wire to PSTN connection 446), and ground station 445 are all native to the same continent 440, it should be possible to handle security transactions for this call in the same way as if mobile 428 had been located on its home continent 440.

Figure 5:
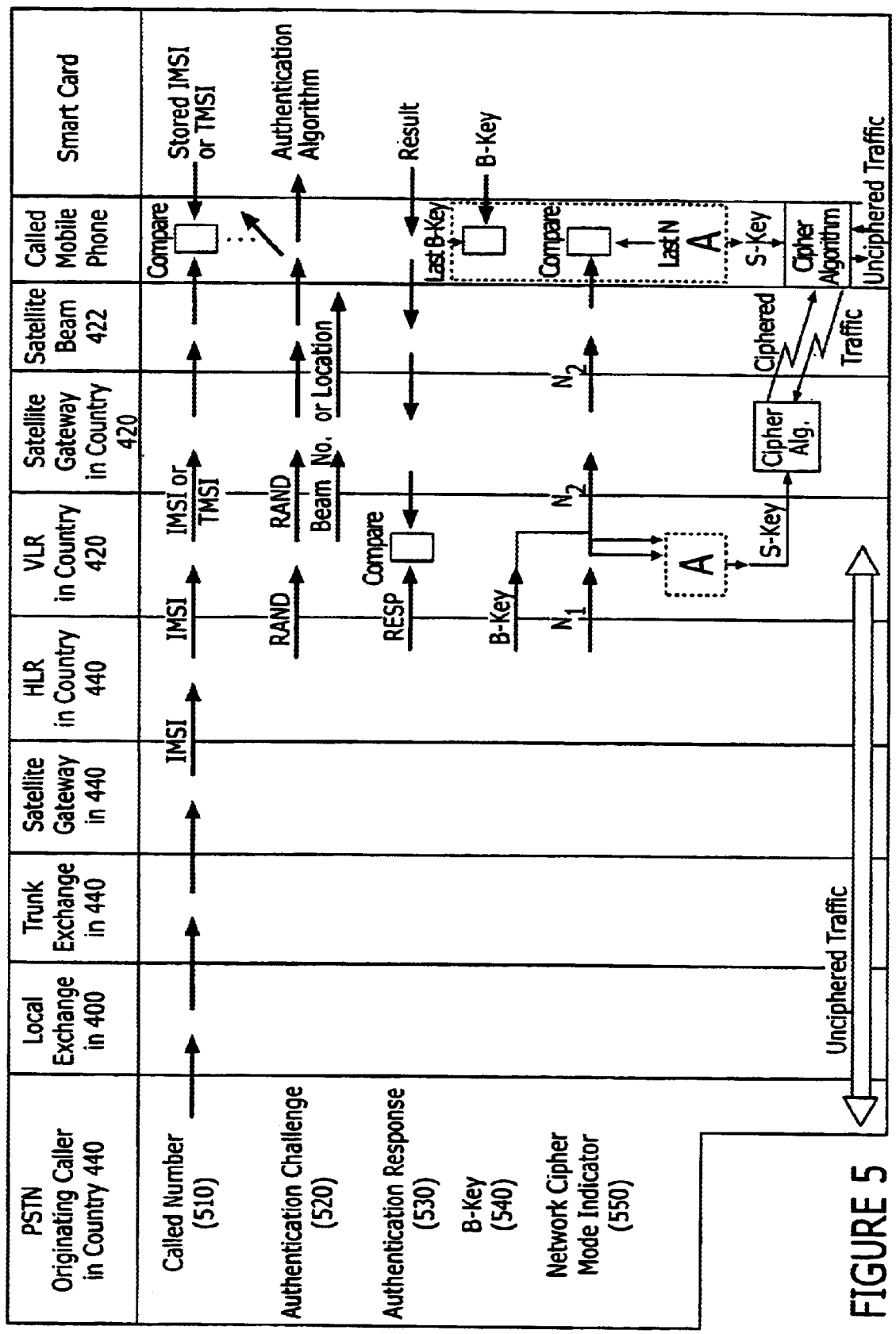
FIG. 5 illustrates a security variable flow in a global satellite communications system according to a preferred embodiment of the invention.

Unfortunately, many policy issues can interfere with this decision, including who will bill the calling and/or called subscriber for the call charges. For example, telecommunications regulations for territory 420 may preclude the owner and/or operator of ground station 445 in territory 440 from directly projecting a telecommunications service into territory 420 because the owner and/or operator of ground station 425 has obtained an exclusive license to transact business in territory 420; therefore, the owner and/or operator of ground station 425 may be required to handle the call for regulatory reasons via ground station 425. In this situation, the security variable flow at call set up would be as illustrated in FIG. 5 as explained hereinbelow.

Suppose the PSTN subscriber (located in continent 440, but not illustrated) is the calling party; then his or her call request is first routed to a Home Location Register (HLR) in the called subscriber's native MSC, associated with ground station 445, where the current location of the mobile 428 (beam 422) is retrieved, and ground station 425 is identified as that which, for the postulated regulatory reasons, must handle calls in beam 422. The call request is then rerouted via international trunk circuits to ground station 425, which calls mobile 428 in beam 422. Ground station 425 does not possess a copy of mobile 428's authentication key (A-key), and it cannot therefore execute the authentication algorithm; it must therefore apply to the called subscriber's home switch (the MSC associated with the ground station 445, referred to as MSC 445' hereinbelow) to obtain a set of security variables. The variables include:

the random authentication challenge, RAND;

the expected response, RESP; and the derived key, B-key.

In this case, the MSC 445' may be able to anticipate that these variables will be requested inasmuch as MSC 445' rerouted the call to MSC 425' (the MSC associated with the ground station 425). The variables obtained from MSC 445' are stored at MSC 425' in a Visitor Location Register (VLR). In general, for economy in international signaling for these transactions, several sets of the above security triplets may be sent in one transaction, the transaction being paid for by a one-time "roaming charge" the first time mobile 428 makes or receives a call in territory 420. Also for economy, ground station 425 does not have to consume a triplet by performing a new authentication on every call, and one triplet may be sufficient for one day's use.

Mobile 428, when at home (HLR), processes the B-key with transmitted and received signals to effect ciphering in a manner previously determined for its home territory and implemented in ground station 445. Now, in territory 420, the question is whether the mobile will adapt to processing the B-key in a manner used by ground station 425 or whether ground station 425 will adapt to processing the B-key, for that call only, in the same way as ground station 445.

Either way, whenever the manner of employing the B-key is different in different territories, an indication of which manner must be adopted for a particular call must be provided either to the mobile station or to the ground station.

The latter option, namely adapting the ground station's processing with the B-key according to either the provenance of the mobile station or of the calling PSTN party, does not arise in cellular networks where calls are always handled by a local MSC and VLR.

According to this invention therefore, there is provided a signaling indication transmitted between satellite ground stations, Mobile Switching Centers, or satellite gateways that are involved in routing the call. The purpose of the signaling indication is to select the mode of processing with the B-key in the ground station designated to handle the call so as to be in accordance with the mode of processing indicated to the mobile station, the indication being dependent on any or all of the following call variables:

(a) the HLR on which the mobile has a permanent subscription;

(b) the VLR in which the roaming mobile is presently registered;

(c) the territory in which the other call party is located;

(d) the territory in which the ground station delegated to handle the call is located; and/or (e) subscriber profile information retrieved from the HLR.

FIG. 5 shows the flow of security variables according to the invention in a network of the type illustrated in FIG. 4. Referring now to row 510, Called Number, a PSTN originating caller is assumed to begin the process by dialing the number of mobile phone 428. The PSTN caller is first connected to his or her local phone exchange, which then upon detecting that the call is not a local call, sends the called number onward to a trunk exchange. The trunk exchange detects from its routing tables that the call is to a satellite network phone and routes the call to the nearest satellite gateway, which is assumed to be located in the same country. In satellite gateway/ground station 445, it is determined that the called number has its subscription (and therefore HLR) at gateway 445. In another case, it might determine that the called number belongs to a non-native subscriber, but one who is temporarily visiting and already has established a VLR there by calling or being called previously. In yet another case, the called number may belong to a non-native subscriber that does not have a VLR entry in the gateway, in which case gateway 445 must determine where that subscriber has an HLR from which his or her current location can be retrieved. The satellite gateway is in the best position to make that determination for a satellite subscriber in the same satellite network, as PSTN local or trunk exchanges, or even cellular Mobile Switching Centers with a Mobility Management capability have not necessarily been modified yet to recognize the existence of satellite network subscribers.

In the case illustrated in FIG. 5, however, the satellite phone number called is native to gateway 445 and has an HLR there, from where the phone's current location is determined to be registered in a VLR at gateway 425. Gateway 445 then engages in a communication with Gateway 425, not all the steps of which are shown in FIG. 5, which is meant only to show security variable flow. The communication between gateway 445 and 425 takes place either over international circuits such as Signaling System No. 7 (SS7), or it may logically take place over special channels established in the feeder link spectrum by which gateways communicate via the satellite, thus confining costs to the satellite network itself and avoiding international transport charges from yet another billing entity. During the exchange between gateways, it may be that sets of security triplets are still available at the VLR, having been sent on a previous call or when mobile phone 428 first announced its presence in country 420 by performing a "registration" or "location update." U.S. patent application Ser. No. 08/179, 958 (Dent, filed Jan. 11, 1994) and Continuation-in-Part application Ser. No. 08/368,877 (Dent, filed Jan. 5, 1995) disclose how such registration, re-registration, de-registration, and location update operations are performed by a dual-mode satellite/cellular phone in communication either with a satellite or with a cellular network into the coverage area of which the dual-mode phone detects it has roamed. The purpose of these operations are to communicate with a phone's HLR to inform the HLR by which route or the other it is now to be reached when called, i.e., via a cellular network's VLR or via a satellite gateway and a particular satellite beam or absolute position coordinates.

In the case illustrated in FIG. 5, it is assumed that the communication between the satellite gateways 425 and 445 determines that no current security triplets are available for mobile 428, either because it is the first time mobile 428 has been called via the satellite or because previously supplied triplets have been exhausted. The HLR associated with gateway 445 then supplies at least one new triplet comprising an authentication challenge RAND, an expected valid response (RESP) and the B-key that is formed as a by product of authentication. In addition, gateway 445 may indicate to gateway 425 that the B-key for mobile phone 428 is normally utilized in a manner indicated by network cipher mode indicator N1. N1 can even indicate that mobile 428 has not subscribed to an enciphering service in territory 440. Nevertheless, gateway 425 may, for technical reasons, determine that, even so, communications via the satellite must always be enciphered and thus modifies the cipher mode indicator from N1 to N2.

One technical reason for doing so is that the error correction coding employed on the satellite link may be ineffective against co-channel interference unless ciphering is also employed. In particular, a code division multiple access (CDMA) system in which all signals employ error correction coding to add redundancy and spread the spectrum may be dependent upon the use of different overall scrambling codes selected by a session key in order to allow the CDMA receiver to discriminate between different overlapping signals. Even if gateway 445 provides an indication N1 of the normal ciphering mode, it is possible that gateway 425 modifies this indication to N2 to accord mobile 428's mode with that employed at gateway 425. The indication N2 passed to mobile 428 therefore may be the same as or different from the indication N1 originally received from gateway 445. To change or not to change can be the subject of agreements between different operators that own respectively gateways 425 and 445.

Continuing with row 510 in FIG. 5, the VLR in country 420, upon recognizing that the International Mobile Station Identity (IMSI) belongs to a mobile registered there, determines if a shorter number called the Temporary Mobile Station Identity (TMSI) can be used to call the mobile. TMSI's are agreed on a local basis and need only be unique to the phones in a particular cellular cell or satellite beam or "paging area," which is formed from a group of neighboring beams or cells. Thus, because TMSI's need discriminate only between this local subset of mobile phones, they can contain fewer digits than the IMSI which must distinguish between all phones globally in existence.

The VLR in country 420 may also have stored the last known position coordinates of mobile 428. This position is passed to the satellite gateway 425, which uses the position to establish the best satellite and antenna beam (beam 422 as drawn in FIG. 4) to use currently for reaching the mobile 428. The satellites and their beams may be static relative to the earth in geostationary orbits, or alternatively, may be moving in medium altitude or low altitude orbits. Thus the translation of mobile location to satellite and beam number can depend on the gateway receiving updates of satellite positions and beam center coordinates on the ground from a satellite tracking system and a beamforming system.

Now referring to row 520 as well, the determined satellite/beam combination is then used by gateway 425 to relay the IMSI or TMSI and the authentication challenge RAND in a call alert message or paging message transmitted on a calling/paging channel the mobile 428 is thought to be listening to. The mobile 428 also receives, either at this time or while previously listening to broadcast messages, the cipher mode indicator N2. The paging channel used can depend upon the IMSI such that all mobile phones are not camped on the same paging channel, but instead they are distributed among several paging channels to spread the paging traffic load.

Continuing with row 520, if the mobile receives and decodes the paging message correctly and detects its IMSI or TMSI, it passes the authentication challenge RAND to the authentication algorithm (see FIG. 2 and related text hereinabove), which may be contained in a plug-in "smart card," which is issued: by the phone's native subscription provider and contains the only other copy of the secret key or A-key outside the HLR. The authentication algorithm and A-key can alternatively be stored in a microprocessor memory in the mobile phone. The operation is the same, however, in that the authentication algorithm combines the A-key with RAND to produce the B-key and RESP (again, see FIG. 2 and related text hereinabove.)

Now referring to row 530, RESP is conveyed to the gateway 425 via the satellite 410 by the mobile phone 428 transmitting an acknowledgment message to the paging message. The gateway 425 relays the result RESP to a comparator illustrated in FIG. 5 as belonging with the VLR in country 420. Now referring to rows 540 and 550 as well, if the comparator verifies that the response matches the expected one for that security triplet, then the B-key is submitted to block A (shown in the VLR column) where it is processed using cipher mode indicator N1 to provide the S-key to the ciphering algorithm used in gateway 425 for ciphering traffic transmitted from the PSTN subscriber to the mobile subscriber 428 via the satellite 410.

Block A in the mobile (shown in the called mobile phone column) also processes the B-key using indicator N2 received from gateway 425, but only after checking to see if that B-key was previously used with a different indicator. If the B-key is the same as a previously stored B-key established at last authentication, but the cipher mode indicator stored has a different value from the currently received value, then the mobile will refuse to continue with the communication and may not even have reached the point of completing its response to the paging message. Alternatively, the paging acknowledgment message can contain an indicator that the mobile is rejecting the use of that particular B-key with the current cipher mode indicator, and it is up to the gateway 425 to determine how and if the call should be continued.

It is for cryptoanalytic reasons that it has been anticipated, as explained above, that if a set of security triplets is intended to service more than one call, to include restrictions in the mobile terminal and base station software to preclude the use of the same triplet for different calls in which the cipher mode indicator is different. In effect, the indication would be permanently attached to a triplet once that triplet is used with that indication, forming a quadruplet. Once formed, security quadruplets must not be broken apart to change any one of the four parameters without changing the others. The onus is on the ground station wishing to re-employ an earlier used triplet to ensure that the mode indicator with which it will be employed a second time is compatible with the mode indicator used previously. The mobile station only remembers the B-key and S-key established during the previous authentication and the mode indicator employed then; thus, the ground station must perform authentication again if the mode indicator changes between calls.

As it may happen that the mode indicator changes frequently between two values (a "Home" value and a "Roam" value, for example), it can be desirable for the ground station to retain, as well as as-yet unused triplets, a previously used "Home" quadruplet and a "Roam" quadruplet. These quadruplets are selected to perform a new authentication with the mobile upon switching the mode from "Roam" to "Home," or vice-versa. This avoids consuming new triplets unnecessarily which would unduly hasten the need for an additional international transaction with the HLR in order to obtain another set of triplets. The above cryptoanalytic safeguard is a preferred implementation, but is optional and not material to other aspects of the invention.

The cipher mode indication passed from the gateway 425 to the mobile 428 can, for example, be the integer N for determining how many times an S-box is used in transforming the B-key into the session key (S-key) that controls the ciphering algorithm. This method however, as disclosed in the parent application, is only an exemplary method of effecting alternative processing at the ground station of signals using the B-key produced by the authentication process. In general, the cipher mode indication can cause a change of the ciphering operation in any of a variety of ways agreed on in advance, including the use of entirely different algorithms (algorithm A, B, C, etc. according to indication value 1, 2, . . . N). It can even include over-the-air downloading of an algorithm from one network station to another network station, or from a network station to a mobile station upon the mobile station first roaming into its service area. Any method of adapting the ciphering of signals using the B-key in dependence on the call variables listed above is considered to be within the spirit and scope of this invention as defined in the following claims. For example, the S-key passed to the ciphering algorithm could comprise the unadulterated S-key plus an indicator of an algorithm number to use for ciphering.

On a global basis, while the problem of ensuring unique mobile station identities may be solved by use of the International Mobile Station Identity (IMSI), the need for unique permanent keys is not solved except by the undesirable formation of a global key allocation authority. Formation of a global key authority furthermore implies that such an authority has access to all keys used the world over, and as such, represents a single point of attack for breaching communications security or for obtaining variables with which to fraudulently obtain service. Without being able to ensure unique permanent keys, and even with such assurance, it is not in any case possible to ensure unique temporary session keys. Nevertheless, using the present invention does ensure that the likelihood of two mobile terminals using the same temporary key is not a concern as it will, when practicing the invention, be an entirely random and unpredictable occurrence.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a mobile telephone network for providing service to a plurality of mobile stations in communication with a plurality of network stations, a first network station comprising:

a mobile station identifier which identifies at said first network station the identity of a mobile station;

a second network station identifier which uses said mobile station identity to determine the identity of a second network station from which a cipher variable may be obtained;

a receiver which receives said cipher variable from said second network station;

a former which forms at said first network station a cipher mode indication in dependence on the identity of said second network station; and a determiner which uses said cipher mode indication formed at said first network station to select an algorithm from a plurality of algorithms and uses the selected algorithm and said cipher variable to encipher or decipher traffic information signals exchanged with said mobile station during a call.

2. In a mobile telephone network for providing service to a plurality of mobile stations in communication with a plurality of network stations, a method comprising the steps of:

determining at a first network station the identity of a mobile station;

using said mobile station identity to determine the identity of a second network station from which a cipher variable may be obtained;

obtaining said cipher variable from said second network station;

forming at said first network station a cipher mode indication in dependence on the identity of said second network station;

using said cipher mode indication at said first network station to select an algorithm from a plurality of algorithms; and using the selected algorithm and said cipher variable to encipher traffic information signals transmitted to said mobile station during a call.

3. In a mobile telephone network for providing service to a plurality of mobile stations in communication with a plurality of network stations, a method comprising the steps of:

determining at a first network station the identity of a mobile station;

using said mobile station identity to determine the identity of a second network station from which a cipher variable may be obtained;

obtaining said cipher variable from said second network station;

forming at said first network station a cipher mode indication in dependence on the identity of said second network station;

transmitting said cipher mode indication from said first network station to said mobile station;

receiving said cipher mode indication at said mobile station and using it to select an algorithm from a plurality of algorithms; and using the selected algorithm for enciphering or deciphering traffic information signals transmitted between said first network station and said mobile station during a call.

4. The method of claim 3, further comprising the step of:

comparing said cipher mode indication received at said mobile station with a previously stored mode indication to form a match indication if the received and previously stored indications are the same or to form a no-match indication if the received and previously stored indications are not the same.

5. The method of claim 4, further comprising the step of:

indicating at said mobile station an error status in the event of said no-match indication being formed.

6. The method of claim 4, further comprising the step of:

transmitting from said mobile station an error indication to said first network station in the event of said no-match indication being formed.

7. In a mobile telephone network for providing service to a plurality of mobile stations in communication with a plurality of network stations, a method comprising the steps of:

determining at a first network station the identity and approximate geographic location of a mobile station;

using said mobile station identity to determine the identity of a second network station from which a cipher variable may be obtained;

obtaining said cipher variable from said second network station;

forming at said first network station a cipher mode indication in dependence on the location of said mobile station, said cipher mode indication indicating which algorithm of a plurality of algorithms is to be used;

transmitting said cipher mode indication from said first network station to said mobile station;

receiving said cipher mode indication at said mobile station and using it to select an algorithm from said plurality of algorithms; and using the selected algorithm for enciphering or deciphering traffic information signals transmitted between said first network station and said mobile station during a call.

8. The method of claim 7, further comprising the step of:

comparing said cipher mode indication received at said mobile station with a previously stored mode indication to form a match indication if the received and previously stored indications are the same or to form a no-match indication if the received and previously stored indications are not the same.

9. The method of claim 8, further comprising the step of:

indicating at said mobile station an error status in the event of said no-match indication being formed.

10. The method of claim 8, further comprising the step of:

transmitting from said mobile station an error indication to said first network station in the event of said no-match indication being formed.

11. In a mobile telephone network for providing service to a plurality of mobile stations in communication with a plurality of network stations, a method comprising the steps of:

determining at a first network station the identity and approximate geographic location of a mobile station;

using said mobile station identity to determine the identity of a second network station from which a cipher variable may be obtained;

obtaining said cipher variable from said second network station;

forming at said first network station a cipher mode indication in dependence on the location of said mobile station, said cipher mode indication indicating which algorithm of a plurality of algorithms is to be used;

using said cipher mode indication at said first network station to select an algorithm from said plurality of algorithms; and using the selected algorithm and said cipher variable to encipher traffic information signals transmitted to said mobile station during a call.

12. In a mobile telephone network for providing service to a plurality of mobile stations in communication with a plurality of network stations, a method comprising the steps of:

determining at a first network station the identity and approximate geographic location of a mobile station;

forming at said first network station a cipher mode indication in dependence on said mobile station identity and location;

accessing a call history memory to determine if said cipher mode indication is the same as or different from that transmitted to said mobile station during a previous call;

accessing said call history memory to retrieve an associated previously stored cipher variable; and using the retrieved cipher variable during a call to encipher and decipher traffic information signals exchanged between said first network station and said mobile station if said cipher mode indication is the same as that transmitted during a previous call.

13. The method of claim 12, further comprising the step of:

transmitting a new cipher mode indication to said mobile station and commanding said mobile station to execute an authentication algorithm if said cipher mode indication is different from that transmitted during a previous call.

14. The method of claim 13, further comprising the step of:

transmitting a random authentication challenge variable from said first network station to said mobile station and using said random authentication challenge variable in said authentication algorithm.

15. The method of claim 13, further comprising the step of:

transmitting from said mobile station to said first network station an output value computed by said authentication algorithm.

16. The method of claim 13, further comprising the steps of:

transmitting a random authentication challenge variable from said first network station to said mobile station and using said random authentication challenge variable in said authentication algorithm; and receiving at said first network station from said mobile station an output value computed by said authentication algorithm as a function of said random authentication challenge variable.

17. The method of claim 13, further comprising the step of:

combining an output value computed by said authentication algorithm with said new cipher mode indication to obtain a new cipher variable in said mobile station.

18. The method of claim 17, further comprising the step of:

using said new cipher variable in place of a previous cipher variable to encipher or decipher traffic information signals exchanged between said mobile station and said first network station.

19. The method of claim 17, further comprising the step of:

overwriting a previous cipher variable stored in said mobile station with said new cipher variable and storing said new cipher mode indication in association thereto.

* * * * *